United States Patent
Takeda et al.

(10) Patent No.: US 8,276,316 B2
(45) Date of Patent: Oct. 2, 2012

(54) SLIDING DOOR DEVICE

(75) Inventors: Norihide Takeda, Kanagawa (JP);
Toshikatsu Hemmi, Kanagawa (JP);
Yoshiharu Kanamori, Osaka (JP);
Katsunori Nakagawa, Osaka (JP)

(73) Assignee: Shiroki Corporation, Kanagawa (JP)

( * ) Notice: Subject to any disclaimer, the term of this patent is extended or adjusted under 35 U.S.C. 154(b) by 477 days.

(21) Appl. No.: 12/490,116

(22) Filed: Jun. 23, 2009

(65) Prior Publication Data
US 2010/0319264 A1      Dec. 23, 2010

(51) Int. Cl.
*E05D 15/10* (2006.01)
(52) U.S. Cl. ............ 49/221; 49/209; 49/215; 49/360
(58) Field of Classification Search ............ 49/209, 49/210, 211, 213, 214, 215, 216, 221, 360; 296/155
See application file for complete search history.

(56) References Cited

U.S. PATENT DOCUMENTS

| | | | | |
|---|---|---|---|---|
| 3,318,048 | A * | 5/1967 | Odend Hal | 49/223 |
| 4,887,390 | A * | 12/1989 | Boyko et al. | 49/214 |
| 6,926,342 | B2 * | 8/2005 | Pommeret et al. | 296/155 |
| 7,243,461 | B2 * | 7/2007 | Rogers et al. | 49/360 |

FOREIGN PATENT DOCUMENTS

JP         07-113373         5/1995

* cited by examiner

*Primary Examiner* — Katherine w Mitchell
*Assistant Examiner* — Catherine A Kelly
(74) *Attorney, Agent, or Firm* — Finnegan, Henderson, Farabow, Garrett & Dunner, L.L.P.

(57) ABSTRACT

The invention relates to a sliding door device including: a slider mounted to the sliding door so as to be movable on the rail; a lever provided in the slider so that a middle part thereof would be rotatable; a first roller provided on one end side of the lever so as to be rotatable on the rail; a recess formed in the rail so that the first roller would fall thereinto before the sliding door reaches a completely closed position, the recess having a rising wall surface of the rail being in a direction intersecting with a rotating surface of the first roller, the rising wall surface capable of coming into contact with the first roller; and a cable mounted to the sliding door for driving the sliding door to a closing direction when the cable is pulled. The cable is connected to the other end side of the lever and causes the lever to rotate in a direction that the first roller pushes the rail when the cable is pulled.

5 Claims, 5 Drawing Sheets

IV-IV

SLIDING DOOR DEVICE

BACKGROUND OF THE INVENTION

1. Field of Invention

The present invention relates to a sliding door device mounted to an opening of a body of a vehicle so as to be able to open and close, the sliding door device being driven in an open and close direction by means of a provided cable.

2. Description of the Related Art

An elastic weather strip undergoes an elastic deformation to come into contact with a sliding door of a sliding door device when the sliding door moves to a completely closed position.

Accordingly, required is force for elastically deforming the weather strip in the vicinity of the completely closed position in addition to normal driving force in the case of moving the sliding door to the completely closed position.

As a sliding door device driven with large force in moving to the completely closed position, proposed has been a sliding door described in the following patent reference 1.

Patent Reference 1: JP-A-7-113373 (FIG. 2)

The sliding door described in Patent Reference 1, however, requires two large diametral drums and two small diametral drums. This causes problems that a mechanism is complicated and the device is large-scaled and increased in weight.

Further, large tension operates on the cable in the vicinity of the completely closed position of the sliding door. This requires a cable of high strength. Moreover, components forming a mechanism for driving the cable and a place for providing the mechanism should also be of high strength. This causes a problem of high cost.

SUMMARY OF THE INVENTION

An object of the invention is to provide a sliding door device, which is small in size, light in weight and low in cost.

The object can be achieved by a sliding door device comprising: a sliding door provided in an opening of a body of a vehicle; a rail provided along an open and close direction of the sliding door; a slider mounted to the sliding door so as to be movable on the rail; a lever provided in the slider so that a middle part thereof would be rotatable; a first roller provided on one end side of the lever so as to be rotatable on the rail; a recess formed in the rail so that the first roller would fall thereinto before the sliding door reaches a completely closed position, the recess having a rising wall surface of the rail being in a direction intersecting with a rotating surface of the first roller, the rising wall surface capable of coming into contact with the first roller; and a cable mounted to the sliding door for driving the sliding door to a closing direction when the cable is pulled, the sliding door device wherein the cable is connected to the other end side of the lever and causes the lever to rotate in a direction that the first roller pushes the rail when the cable is pulled.

In accordance with the invention, the device comprises the sliding door, the rail, the slider mounted to the sliding door, the lever rotatably provided in the slider, the first roller provided in the lever so as to be rotatable on the rail, the recess formed in the rail and the cable mounted to the sliding door for driving the sliding door in a closing direction when the cable is pulled. This allows a mechanism to be simple, a size to be reduced and the weight to be reduced.

Further, a fall of the first roller into the recess formed in the rail causes "the lever" to be formed. "The lever" has the first roller provided on one end side of the lever as a fulcrum, the other end side of the lever, which is connected to the cable, as a point of "the lever" where force is applied and the rotational axis of the lever as a point of action. The point of action exists between the point of force and the fulcrum. Accordingly, the slider and the sliding door are driven to the closing direction with force greater than force operating before the first roller falls into the recess of the rail.

At that time, the force for driving the sliding door is increased due to "the lever". The tension operating on the cable is thus same as the tension operating before the first roller falls into the recess. Accordingly, no cable of high strength is required. Furthermore, components forming a mechanism for driving the cable and a place for providing the mechanism should also not be of high strength. This allows a cost to be low.

These and other objects, features and advantages of the present invention will become more apparent upon reading of the following detailed description along with the accompanied drawings.

DETAILED DESCRIPTION OF THE INVENTION

Figure 3:
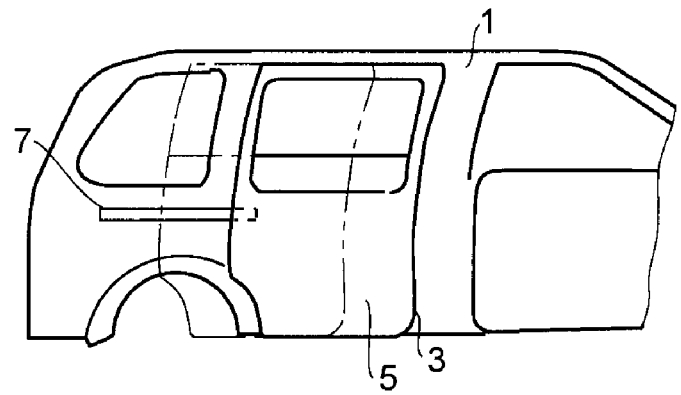
FIG. 3 is a side view of a vehicle provided with a sliding door.

First of all, described will be a whole structure of a sliding door device, made reference to FIG. 3. FIG. 3 is a side view of a vehicle provided with a sliding door. An opening 3 is provided in a side surface of a body 1. A sliding door 5 is mounted to the opening 3 so as to be capable of opening and closing. A rail 7 is provided in the body 1 along an open and close direction of the sliding door 5. In the opening 3, provided is a weather strip elastically deformed to come into contact with the closed sliding door.

Figure 1:
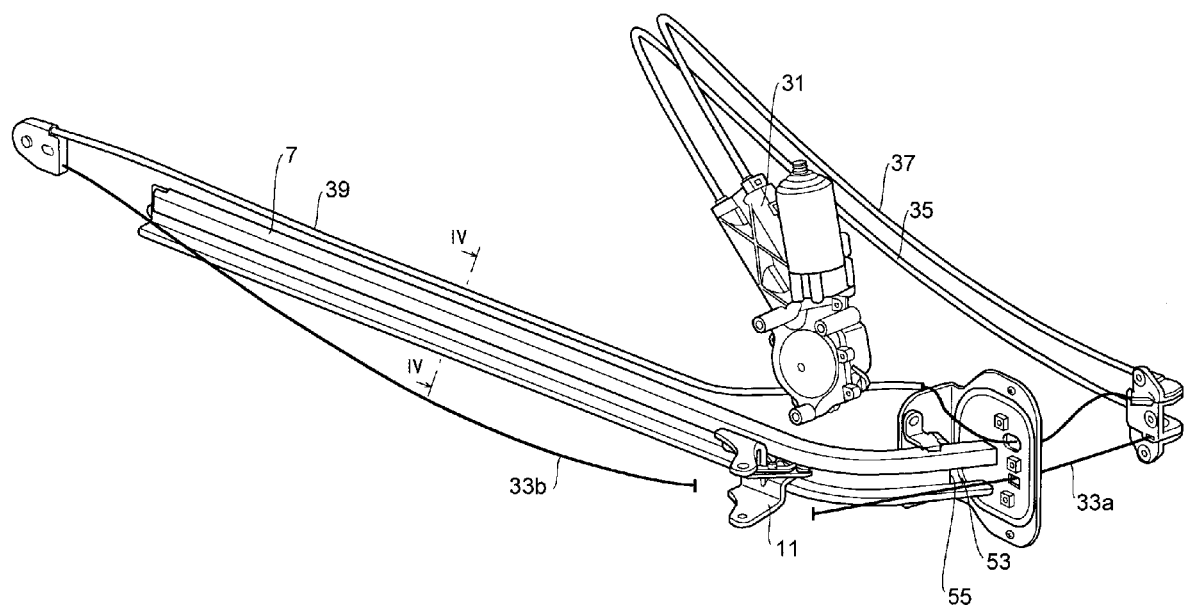
FIG. 1 is an exploded perspective view of a mechanism for driving a sliding door.
Figure 2:
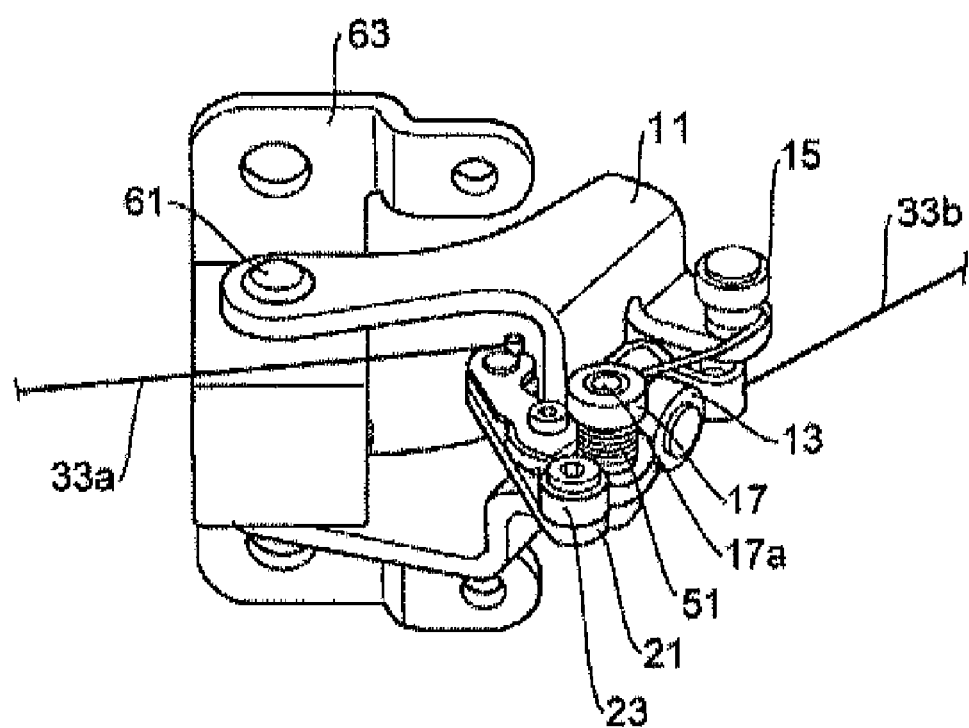
FIG. 2 is an enlarged view of a slider part in FIG. 1.
Figure 4:
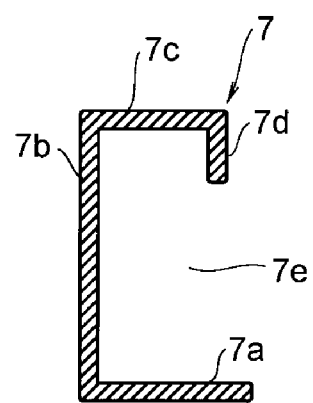
FIG. 4 is a sectional view taken along a cutting line IV-IV in FIG. 1.
Figure 5:
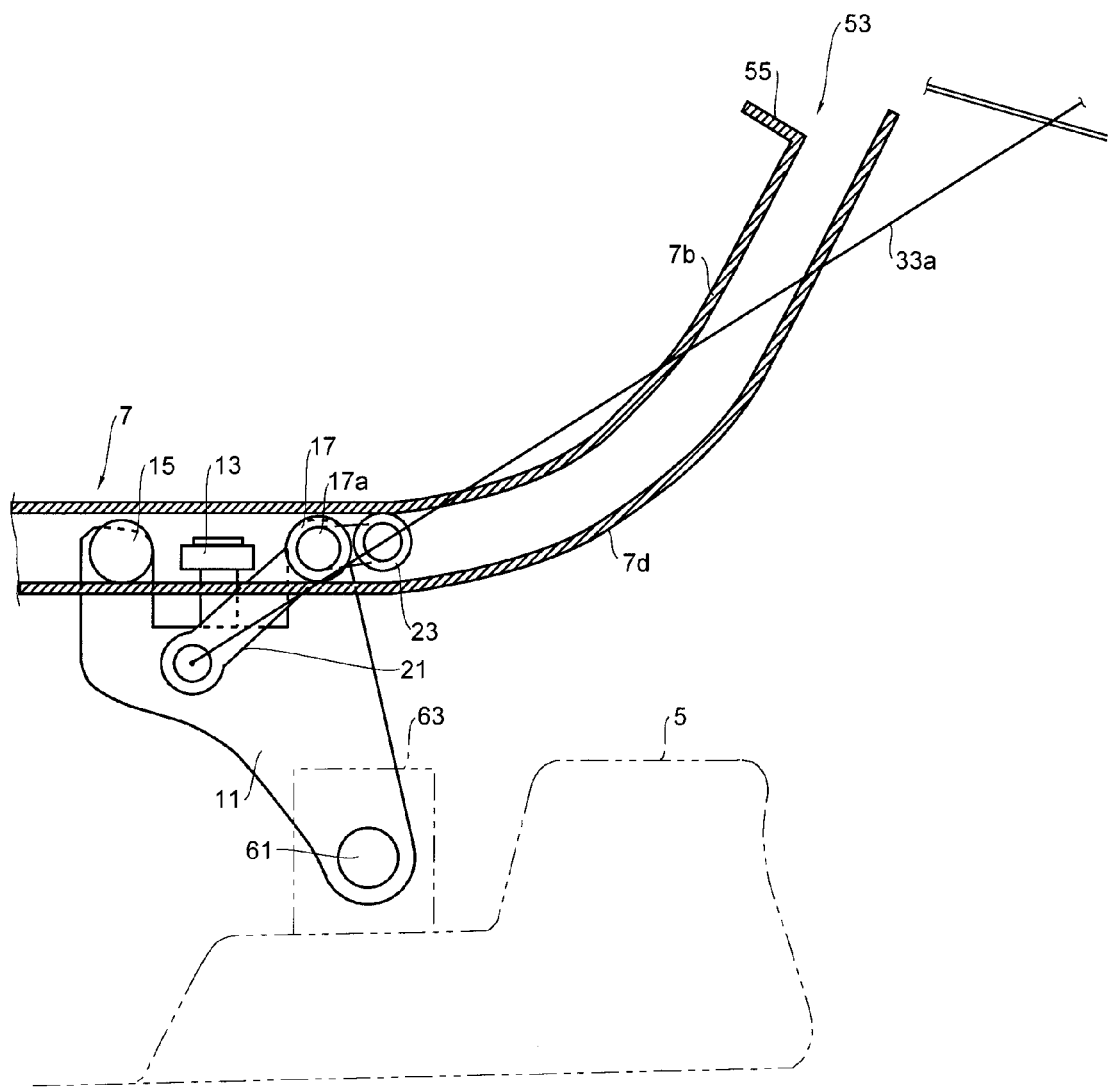
FIG. 5 illustrates an operation.
Figure 6:
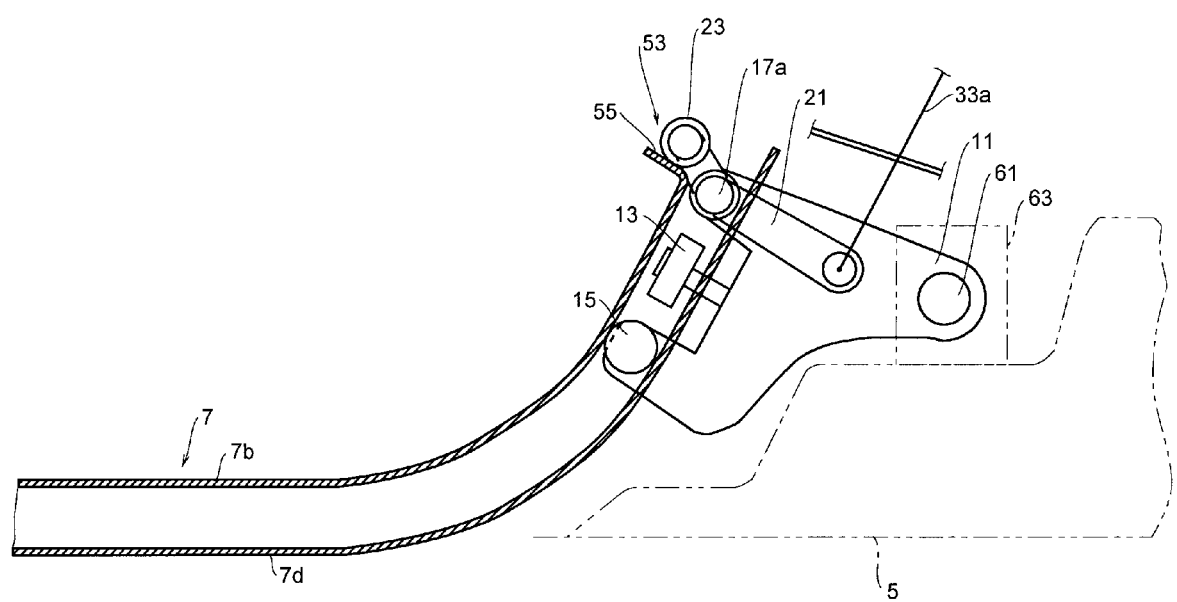
FIG. 6 illustrates an operation.

Now, described will be a mechanism for driving the sliding door 5 with reference to FIGS. 1 to 6. FIG. 1 is an exploded perspective view of the mechanism for driving the sliding door 5. FIG. 2 is an enlarged view of a slider part in FIG. 1. FIG. 4 is a sectional view taken along a cutting line IV-IV in FIG. 1. FIG. 5 illustrates an operation of the sliding door, showing an opening state of the sliding door 5. FIG. 6 illustrates an operation of the sliding door, showing a closed state of the sliding door 5.

As shown in FIG. 1, one end (a right end in FIG. 1) of the rail 7 is bent toward the inner side of the body so that the sliding door 5 would be fitted in the opening 3. A cross section of the rail 7 is formed from a bottom part 7a, a first side part 7b bending upward from one end of the bottom part 7a, a ceiling part 7c bending from an upper part of the first side part 7b, the ceiling part 7c being faced to the bottom part 7a and a second side part 7d bending toward the bottom part 7a from the other end of the ceiling part 7c, as shown in FIG. 4. A gap 7e is formed between the second side part 7d and the bottom part 7a.

Returning to FIG. 1, the rail 7 is provided with a slider 11. Now, described will be the slider 11, made reference to FIG. 2. The slider 11 is provided with a second roller 13 rolling on the bottom part 7a of the rail 7 and a third roller 15 and a fourth roller 17, which are capable of rolling on the first side part 7b and the second side part 7d of the rail 7. Providing the second roller 13, the third roller 15 and the fourth roller 17 allows the slider 11 to be movable along the rail 7. In the embodiment, the fourth roller 17 is provided on a top end side of the slider 11 in moving in a closing direction of the sliding door 5. Furthermore, a middle part of a lever 21 is provided in the slider 11 so as to be rotatable with respect to an axis 17a of the fourth roller 17, as shown in FIG. 5. A first roller 23 rotatable on the first side part 7b of the rail 7 is provided on one end side of the lever 21.

Returning to FIG. 1, 31 denotes a drum driving unit provided in the body 1. The drum driving unit 31 comprises a drum wound with a cable and a motor for rotating and driving the drum. The drum driving unit 31 has a structure same as that of a drum driving unit used for a wire type electric window regulator. Accordingly, omitted is a detailed description of the drum driving unit 31.

Two cables 33a and 33b extend from the drum driving unit 31. The cable 33a is wound around a drum in the drum driving unit 31 and the cable 33b is let out from the drum when the drum rotates in one direction. Conversely, the cable 33a is let out from the drum and the cable 33b is wound around the drum when the drum rotates in the other direction.

A hollow first outer casing 35 and a hollow second outer casing 37 are provided between the drum driving unit 31 and one end of the rail 7, as shown in FIG. 1. A hollow third outer casing 39 is provided between one end of the rail 7 and the other end of the rail 7.

The cable 33a passes through the first outer casing 35 to be led to one end of the rail 7. A top end of the cable 33a is connected to the other end of the lever 21 of the slider 11, as shown in FIG. 2.

Returning to FIG. 1, the cable 33b passes through the second outer casing 37 and the third outer casing 39 to be led to the other end of the rail 7. A top end of the cable 33b is connected to the slider 11, as shown in FIG. 2.

Further, the lever 21 is provided with a spring (an urging means) 51 for urging the lever 21 in a direction that the first roller 23 is away from the first side part 7b of the rail 7, the spring 51 having a middle part wound around the axial 17a, one end locked on the slider 11 and the other end locked on the lever 21, as shown in FIG. 2.

As shown in FIGS. 1, 5 and 6, formed in the first side part 7b of the rail 7 is a recess 53, which is formed so that the first roller 23 would fall thereinto before the sliding door 5 reaches the completely closed position. The recess 53 is provided with a rising wall surface 55, which is a surface in a direction intersecting with the first side part 7b of the rail 7 (a rolling surface of the first roller 23), the rising wall surface 55 being capable of coming into contact with the first roller 23.

Moreover, the slider 11 is rotatably mounted to a bracket 63 provided in the sliding door 5 by means of a pin 61, as shown in FIGS. 2, 5 and 6.

Now, described will be an operation of the sliding door having the above structure, made reference to FIGS. 5 and 6.

The second roller 13 of the slider 11 is in contact with the bottom part 7a of the rail 7 while the third roller 15 and the fourth roller 17 are in contact with the second side part 7d of the rail 7, as shown in FIG. 5. The cable 33a is wound around the drum in the drum driving unit 31 while the cable 33b is let out from the drum when the drum rotates in one direction. The cable 33a, which has been wound around the drum and pulled, causes the slider 11 and the sliding door 5 to move to the closing direction. Furthermore, the lever 21 rotates against urging force of the spring 51 since the cable 33a is pulled. The first roller 23 of the lever 21 moves to a direction for pushing the first side part 7b of the rail 7 to rotate on the first side part 7b of the rail 7.

The first roller 23 falls into the recess 53 formed in the rail 7 to come into contact with the rising wall surface 55 of the recess 53 before the sliding door 5 reaches the completely closed position, as shown in FIG. 6. This forms "a lever" having the first roller 23 provided on one end side of the lever 21 as a fulcrum, the other end side of the lever 21, which is connected to the cable 33a, as a point of a lever where force is applied and the axis 17a, which is a rotational axis of the lever 21, as a point of action.

The lever 21 rotates with the first roller 23 being used as the fulcrum to drive the slider 11 to the closing direction of the sliding door 5 when the cable 33a is pulled. The point of action is between the point of force and the fulcrum. Accordingly, the slider 11 and the sliding door 5 are driven to the closing direction with force greater than the force operating before the first roller 23 falls into the recess 53 of the rail 7.

The cable 33b is then wound around the drum in the drum driving unit 31 while the cable 33a is let out from the drum when the drum rotates in the other direction. The cable 33b having been wound around the drum and pulled causes the slider 11 and the sliding door 5 to move to the opening direction. At that time, the urging force of the spring 51 causes the lever 21 to rotate since the cable 33a is let out from the drum. The first roller 23 of the lever 21 moves to a direction away from the first side part 7b of the rail 7 not to come into contact with the first side part 7b of the rail 7. Accordingly, no "lever" described above is formed.

In accordance with such a structure, achieved can be the following advantages.

(1) The device comprises the rail 7 provided along the open and close direction, the slider 11 mounted to the sliding door 5 so as to be movable on the rail 7, the lever 21 provided in the slider 11 so that a middle part thereof would be rotatable, the first roller 23 provided on one end side of the lever 21 so as to be able to rotate on the rail 7, the cable 33a connected to the other end side of the lever 21 and wound in closing the sliding door, the cable 33a causing the lever 21 to rotate in a direction that the first roller 23 pushes the rail 7 when the cable 33a is wound, and the recess 53 formed in the rail 7 so that the first roller 23 would fall thereinto before the sliding door reaches the completely closed position. This allows a mechanism to be simple, a size to be reduced and the weight to be reduced.

(2) The first roller 23 falls into the recess 53 after the sliding door 5 is driven to the closing direction before the sliding door 5 reaches the completely closed position. This forms "the lever" having the first roller 23 provided on one end side of the lever 21 as a fulcrum, the other end side of the lever 21, which is connected to the cable 33a, as a point of "the lever" where force is applied and the axis 17a of the lever 21 as a point of action. The point of action exists between the point of force and the fulcrum. Accordingly, the slider and the sliding door are driven to the closing direction with force greater than force operating before the first roller 23 falls into the recess 53 of the rail 7.

The force for driving the sliding door 5 is greater than the force of "the lever" at that time. On the other hand, the tension operating on the cable 33a is same as the tension operating before the first roller 23 falls into the recess 53.

Accordingly, no cable of high strength is required. Furthermore, components forming a mechanism for driving the cable and a place for providing the mechanism should also not be of high strength. This allows a cost to be low.

(3) The spring 51 for urging the lever 21 is provided in the direction that the first roller 23 is away from the rail 7.

Accordingly, the first roller 23 is away from the rail 7 in the case that the wire 33a is not pulled, that is, when the sliding door 5 moves to the opening direction. This causes sliding resistance to the sliding door 5 to be reduced, so that the driving force in the opening direction of the sliding door 5 is reduced.

(4) The fourth roller 17 and the lever 21 have the common axis. This allows the slider 11 to be miniaturized.

The invention is not limited to the above embodiment. The lever 21 is provided rotatably upon the axis of the fourth roller 17 in the embodiment. It may be provided, however, in any place as long as it is in the slider 11. The lever 21 may be further provided rotatably upon the axis of the second roller or the third roller 15.

Moreover, various kinds of modification may be put into practice within a range not deviated from the spirit and claims of the invention.

This applicant is based on Japanese Patent Application serial no. P2007-131726 filed in Japan Patent Office May 17, 2007, the contents of which are hereby incorporated by reference.

What is claimed is:

1. A sliding door device comprising:
   a sliding door provided in an opening of a body of a vehicle;
   a rail provided along an open and close direction of the sliding door;
   a slider mounted to the sliding door so as to be movable on the rail;
   a lever, the lever being rotatably mounted on the slider about an axis of rotation and the lever having first and second ends, with the axis of rotation of the lever located between the first and second ends;
   a first roller provided adjacent the first end of the lever so as to rotate on a first side part of the rail as the door moves along at least a first portion of the rail;
   a recess formed in the rail so that the first roller would fall thereinto before the sliding door reaches a completely closed position, the recess having a wall surface of the rail in a direction intersecting with the first side part of the rail, the wall surface capable of coming into contact with the first roller;
   a cable mounted to the lever at a cable connection point adjacent the second end of the lever for driving the sliding door to a closing direction when the cable is pulled; and
   the sliding door device, wherein as the cable is pulled in a first direction to cause the door to close, the cable causes the lever to rotate in a direction toward the first side part of the rail until the first roller reaches the recess, at which point the first roller engages the wall surface of the rail and the lever is positioned and shaped to increase the effect of the pull of the cable to facilitate final closing of the door.

2. The sliding door device according to claim 1, wherein an urging means for urging the lever in a direction that the first roller would be away from the rail is provided.

3. The sliding door device according to claim 1 or 2, wherein the slider has plural rollers rotating on the rail and a rotational axis of one of the rollers has the same axis of rotation as the axis of rotation of the lever.

4. The sliding door device according to claim 1 or 2, wherein the lever is configured such that when the door travels along the rail, the cable connection point and the door are located on the same side of a plane intersecting the axis of the rotation of the lever and the center of the first roller.

5. The sliding door device according to claim 4, wherein the lever is bent.

\* \* \* \* \*